UNITED STATES PATENT OFFICE 2,425,745

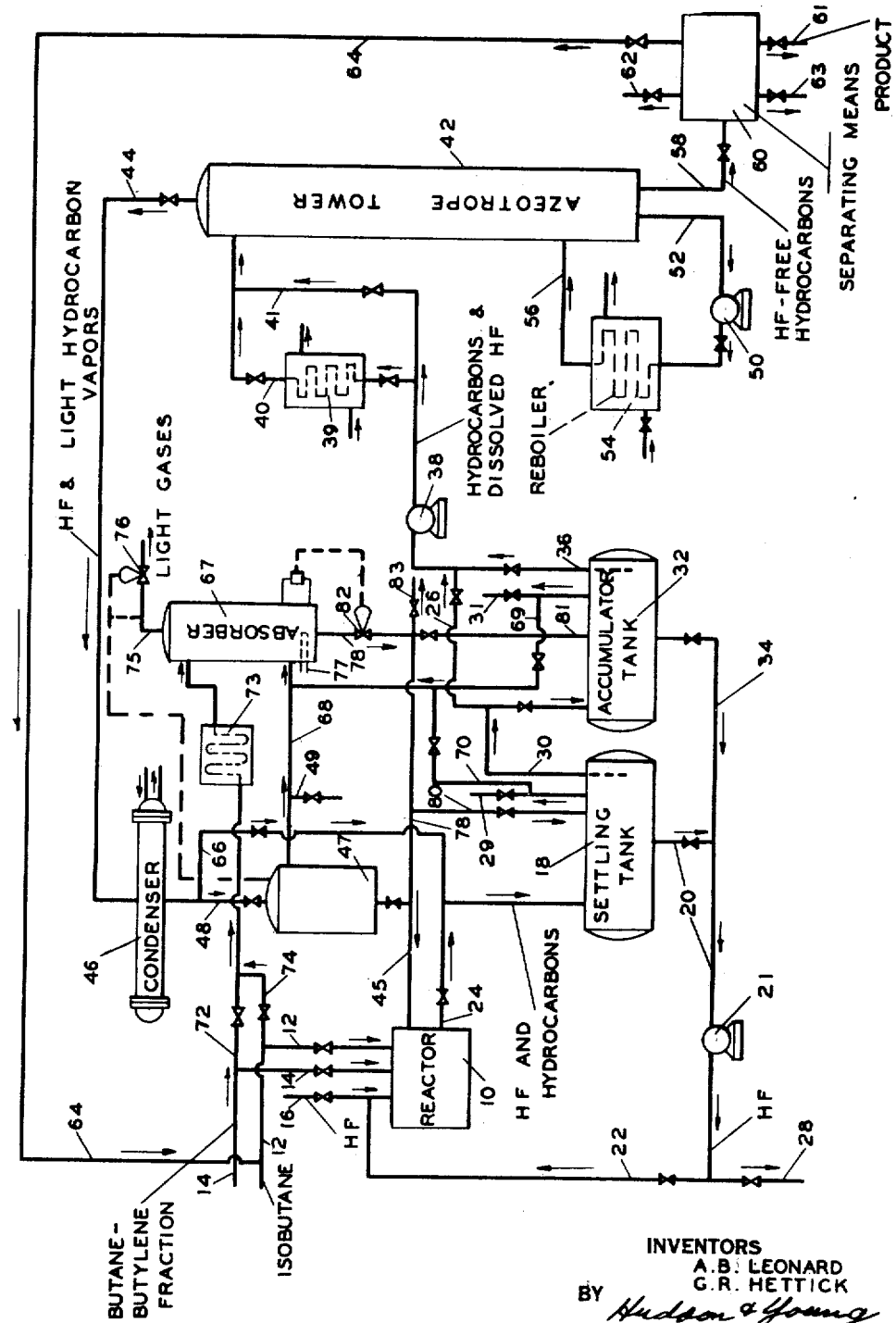

RECOVERY OF HYDROGEN FLUORIDE FROM GASES

Ancel B. Leonard and George R. Hettick, Phillips, Tex., assignors to Phillips Petroleum Company, a corporation of Delaware Application June 10, 1944, Serial No. 539,726

10 Claims. (Cl. 260—683.4)

This invention relates to the removal of hydrogen fluoride from gaseous mixtures containing the same. In one specific embodiment the invention relates to the removal of hydrogen fluoride from gaseous mixtures containing in addition hydrogen and/or low-boiling hydrocarbons, especially low-boiling saturated hydrocarbons such as methane, ethane, propane, and/or a butane.

Hydrogen fluoride in the form of a liquid, commonly used as highly concentrated or substantially anhydrous hydrofluoric acid, has recently come into prominence as a very important catalyst for numerous organic reactions. For example, it is used alone, or in admixture with minor amounts of a boron halide such as boron fluoride, as a catalyst in the conversion of hydrocarbons by alkylation, isomerization, disproportionation, and the like. It is also used as a refining agent and/or a selective solvent to remove materials such as organic fluorine compounds, sulfur compounds, and other non-hydrocarbon organic impurities from liquid hydrocarbon materials such as effluents of a hydrocarbon-alkylation step, natural gasolines, lubricating oil fractions, and the like.

Perhaps the most important industrial process at the present time which involves the use of hydrofluoric acid as a catalyst is the alkylation of low-boiling paraffinic hydrocarbons, particularly isobutane and/or isopentane, with alkylating reactants, particularly low-boiling olefins such as propylene, various butylenes, and/or various amylenes to form normally liquid paraffins which generally have high octane numbers and are quite valuable as constituents of aviation fuels. In such alkylation processes the reactants are intimately contacted in liquid phase at temperatures between about 50 and about 150° F. with liquid concentrated hydrofluoric acid for reaction periods ranging from about 1 to about 30 minutes, and reaction effluents are passed to a settling zone wherein a liquid hydrocarbon phase and a liquid acid phase are separated. A large portion of the liquid hydrofluoric acid phase from this settling zone is generally recycled to the reaction zone while a portion thereof is generally withdrawn and subjected to purification for the removal of water and acid-soluble organic impurities. The hydrocarbon phase from the settling zone is generally subjected to fractional distillation to remove hydrogen fluoride dissolved therein, which is generally present to the extent of about 0.5 to about 3 per cent by volume. As disclosed in Frey Patent 2,322,800, issued June 29, 1943, hydrogen fluoride forms with low-boiling paraffin hydrocarbons minimum-boiling azeotropic mixtures, and the fractional distillation which has just been mentioned generally is so conducted that all the hydrofluoric acid dissolved in the hydrocarbon phase is removed in the overhead distillate together with a sufficient amount of low-boiling paraffin hydrocarbons to form such an azeotropic mixture and to insure that the kettle product from the fractional distillation column, generally referred to as the azeotrope tower, is substantially free from hydrogen fluoride. This overhead product may be cooled and condensed and either returned to the reaction zone directly, passed to the aforesaid settling zone, or passed to a separate accumulator as may be desired or seem most expedient in any particular instance.

In most of the plants operating in the previously described manner the overhead fraction from the azeotrope tower is either passed to the settling zone or to an accumulator which discharges directly to the reaction zone. In some instances at least a portion of the material from the accumulator, especially the liquid hydrocarbon phase, may be returned to the azeotrope tower as reflux. This latter procedure is followed when the feed is not added at the top of the azeotrope tower as a combined feed and reflux stream. In any event any light gases such as hydrogen, methane, ethane, or propane tend to build up within the system and must vented from time to time in order that the pressure will not increase unduly. Hydrogen fluoride escapes in such light gases and not only constitutes a health hazard if not properly neutralized, but also constitutes a loss of valuable material whether neutralized or not. We have found that the hydrogen fluoride present in such gases may be removed therefrom and returned to the system without contaminating the system with any undesired foreign material by contacting these gases with a liquid low-boiling hydrocarbon material which will selectively absorb the hydrogen fluoride. Preferably this low-boiling hydrocarbon material will contain a sufficient amount of olefin hydrocarbons to react with the hydrogen fluoride forming alkyl fluorides. These alkyl fluorides do not act as a contaminant in the alkylation system, but on the contrary enter into the reaction as alkylating reactants along with olefins initially charged to the system.

It is an object of this invention to remove hydrogen fluoride from a gaseous mixture containing same.

Another object of this invention is to recover hydrogen fluoride from mixtures thereof with low-boiling hydrocarbons discharged from a hydrocarbon conversion process in which hydrogen fluoride is employed as a catalyst.

A further object of this invention is to improve the operation of a fractional distillation system in which hydrogen fluoride is removed in a low-boiling azeotropic mixture which is returned to a stream from which the fractional distillation system is fed.

Other objects and advantages of our process will be apparent to one skilled in the art from the accompanying disclosure and description.

Although, as previously discussed, our invention can be applied with advantage in many modifications, particular benefits of it have been realized in connection with the alkylation of low-boiling isoparaffins with low-boiling olefins in the presence of a liquid hydrofluoric acid catalyst. It is believed that the principles of our invention may be adequately illustrated by the discussion of such a specific modification in connection with the accompanying drawing which forms a part of this application, and which illustrates diagrammatically an arrangement of apparatus suitable for practicing our invention in connection with such an alkylation process.

Referring now to the drawing, a reaction zone is represented diagrammatically by rectangle 10. Low-boiling isoparaffin, such as isobutane, is charged through pipe 12 while an olefin-containing fraction, such as a butane-butylene fraction from the refinery, or a butylene-amylene fraction from a refinery, is charged through pipe 14. Typical examples of such olefin-containing fractions are shown in the following table:

| Component | Liquid Volume, Per cent | | | | | |
|---|---|---|---|---|---|---|
| | A | B | C | D | E | F |
| Propane and Lighter | 0.8 | 8.1 | 0.2 | 0.5 | 0.6 | 0.7 |
| Isobutane | 9.6 | | 7.9 | 35.1 | 30.7 | 33.0 |
| Butylenes | 16.6 | 24.9 | 20.0 | 17.0 | 17.3 | 16.3 |
| Normal Butane | 22.4 | 28.2 | 22.7 | 34.4 | 37.9 | 35.6 |
| Amylenes | 13.7 | 13.9 | 15.0 | 4.8 | 5.0 | 4.6 |
| Pentanes | 36.5 | 24.8 | 33.9 | 8.2 | 8.5 | 9.8 |
| Heavier | 0.4 | 0.1 | 0.3 | | | |
| | 100.0 | 100.0 | 100.0 | 100.0 | 100.0 | 100.0 |

A sufficient amount of isobutane is introduced, comprising fresh isobutane through line 12 and recycled unreacted isobutane passing through line 64, so that the mol ratio of isobutane to olefins in the total feed to reactor 10 is between about 3:1 and 10:1, preferably about 5:1. Hydrofluoric acid catalyst is added, in part as fresh hydrofluoric acid through pipe 16 and in part as recycled hydrofluoric acid through pipe 22, to provide a hydrocarbon to acid ratio of between about 1:1 and about 10:1. The mixture of liquid hydrofluoric acid and liquid hydrocarbon is intimately admixed for a suitable reaction time as previously discussed, and the resulting mixture is passed through pipe 24 to settling tank 18 wherein a phase separation between a liquid hydrocarbon phase and a liquid hydrofluoric acid phase is readily obtained by settling. In case the conversion carried out in reaction zone 10 is at a temperature higher than that which will permit ready separation of the effluents into two liquid phases, suitable cooling means, not shown, may be provided in line 24 to bring the mixture within a preferred temperature range; generally a temperature of about 80 to about 100° F., such as is obtained by ordinary cooling water, will be found to be satisfactory. The acid phase is withdrawn from settling tank 18 through line 20 and is returned by pump 21 through pipe 22 to reactor 10. The upper liquid hydrocarbon phase is passed from settling tank 18 through pipe 30 to an accumulator tank 32. Any residual amounts of entrained undissolved hydrofluoric acid may settle out and be passed by pipe 34 to pump 21. A liquid hydrocarbon phase containing dissolved hydrogen fluoride is withdrawn from accumulator tank 32 through pipe 36 and is passed by means of pump 38 and pipe 41 to a fractional distillation column, or azeotrope tower, 42. In a preferred manner of operation this stream is added near the top of the azeotrope tower so that it serves as a reflux stream as well. This liquid feed is ordinarily obtained from accumulator tank 32 at substantially atmospheric temperature and generally need not be cooled before being introduced into tower 42. In some instances, in order to increase the capacity of the fractionator, the feed stream passing from pump 38 may be passed at least in part through heater 39 and then through pipe 40 back to pipe 41. If, in any particular instance, accumulator tank 32 is deemed unnecessary, the stream passing through pipe 30 may be by-passed through pipe 26 directly to pipe 36.

In azeotrope tower 42 a continuous fractional distillation is carried out whereby all of the dissolved hydrogen fluoride is stripped from the feed and withdrawn, together with a sufficient amount of low-boiling paraffin hydrocarbons to form a minimum-boiling azeotropic mixture therewith, as an overhead product through pipe 44. The remainder of the feed to the azeotrope tower, comprising the bulb of the unreacted isobutane and the resulting alkylate free from hydrogen fluoride, is passed from the bottom of the azeotrope tower 42 through pipe 58 to separating means 60. In order to supply heat to the fractional distillation a liquid stream may be removed from the bottom of azeotrope tower 42 through pipe 52 and is passed by pump 50 into reboiler 54. Heat may be supplied by steam or by a suitable burner as is most expedient. The heated liquid is returned to the lower portion of the tower 42 through pipe 56. As will be readily appreciated, other means of supplying heat known to the art may be substituted for the specific means shown.

In separating means 60 a desired product such as a light alkylate is recovered through pipe 61. Any undesired materials such as normal butane may be discharged from the system through pipe 62. A heavy alkylate fraction may be discharged through a pipe 63. Unreacted isobutane is separated and recycled to reactor 10 through pipe 64.

A low-boiling fraction passing through pipe 44 is passed to condenser 46, wherein a cooling and condensation is effected by a suitable heat exchange medium in the condenser, and the resulting condensate may be passed through pipe 48 to an accumulator 47. From accumulator 47 the liquid material may be returned directly to the reactor 10 through pipe 45. In some instances it may be found desirable to eliminate accumulator 47 in which case the condensate may be passed from pipe 48 through pipe 66 to pipe 24 and settling tank 18.

In accumulator 47, or accumulator 32, depending upon which is used in any specific modification, light gases will tend to build up. If accumulator tank 32 is not employed, such light gases may tend to accumulate in settling tank 18. Such light gases may be vented through pipes 49, 31, and/or 29, respectively, but as discussed herein such light gases contain gaseous hydrogen fluoride. In order that this gaseous hydrogen fluoride may not be lost the gases are passed to absorber 67 through pipes 68, 69, and/or 70, respectively. This absorber may be operated at atmospheric temperature with entirely satisfactory results, and a preferred operating temperature will nearly always be found in the range of about 50 to about 150° F. The absorber should be made of a material which is not attacked by hydrogen fluoride and also should be packed with a similar material. The hydrocarbon material effluent from reactor 10 is nearly always substantially anhydrous since any water which may be present in the system will be concentrated in the liquid hydrofluoric acid phase which separates from the hydrocarbon phase. For this reason the gases charged to absorber 67 will also be substantially anhydrous. If the liquid hydrocarbon material charged as absorbent to absorber 67 is also substantially anhydrous, as it will be in the preferred operation of our process, ordinary steel will be found to be a satisfactory material both for the construction of the absorber and for the packing. Such packing may comprise bubble plates, jack-chain, steel turnings such as are obtained from a machine shop, Raschig rings made of an inert material, such as steel, carbon, or the like, or any other material of an inert nature which can be readily supplied by one skilled in the art. A preferred liquid hydrocarbon material used in our absorption step is a portion of the olefin-containing feed to reactor 10. A suitable portion may be passed from pipe 14 through pipe 72 to the top of absorber 67. If desired, this stream may be cooled in cooler 73 although in many instances the use of cooler 73 will not be necessary. If it is desired to use a paraffinic hydrocarbon material as the absorption liquid, a portion of the isobutane charged through pipe 12 may be passed to pipe 72 through pipe 74. However, such a paraffinic absorption liquid generally does not give nearly as satisfactory operation as will an olefin-containing hydrocarbon material. The gases pass upwardly countercurrent to the down-flowing absorbent. Apparently at least a portion of the hydrogen fluoride will react with the olefins under the conditions described to form alkyl fluorides. The light gases, free from hydrogen flouride, are removed through pipe 75 and may be discharged from the system. This discharge may be effected through a pressure control valve 76 actuated in accordance with the pressure on top of absorber 67, or in accordance with the pressure on the particular accumulator tank from which is withdrawn the gas fed to absorber 67, such as accumulator tank 47 as shown. Although not always necessary, heat may be supplied at the bottom of the absorber as by means of a heating coil 77. The rich absorbent containing dissolved hydrogen fluoride and/or dissolved alkyl fluorides is removed through pipe 78 and may be passed directly to pipe 45 and reactor 10, or may be passed to settling tank 18 through pipe 80, or an accumulator such as accumulator tank 32 through pipe 81. The flow through pipe 78 may be controlled by a valve 82 actuated by a liquid level control in the bottom of absorber 67. Any desired amount of the material flowing through pipe 78 may be discharged from the system for other uses through pipe 83.

It will be readily appreciated by one skilled in the art that the drawing is schematic only and that numerous pieces of additional equipment such as alkylation contactors, means for removing the heat from such contactors, fractional distillation columns and associated equipment for separating means 60, and various pumps, flow control valves, heating and cooling means, and the like, have not been shown in detail. However, a sufficient amount of the essential equipment and a discussion of the general flow, material compositions, and operating conditions have been given herein to act as a complete guide to one skilled in the art to enable him to adapt our invention and install equipment for any specific modification thereof. A somewhat similar material flow will be used when aromatic hydrocarbons are alkylated or when either paraffin or aromatic hydrocarbons are alkylated with other alkylating reactants such as alkyl halides, alcohols, and the like. The application of our invention to the effluents of an isomerization process in which hydrofluoric acid is used as a catalyst will not be materially different from that which has been discussed in connection with alkylation.

As an example of the application of our invention, a butane-butylene fraction containing a small amount of pentanes and amylenes, is charged to an alkylation system. Day to day variations in the composition of this feed are illustrated by the compositions shown by samples D, E and F given in the table hereinbefore presented. A sufficient amount of unreacted recycled isobutane is added to make the liquid volume ratio of isobutane to olefins about 4.6:1. The reaction temperature is maintained at about 84° F., the pressure at about 100 pounds gage, the ratio of liquid hydrocarbon to hydrofluoric acid at about 1:1, and the reaction time, with intimate admixing, about 10 minutes. The reaction effluents are passed to settling equipment, with separation of a liquid hydrocarbon phase from a liquid hydrofluoric acid phase. The liquid hydrocarbon phase is passed at a temperature of about 130° F. to the top of a 20-tray fractional distillation column, or azeotrope tower, with the temperature at the top being about 140° F. and the pressure about 175 pounds gage. The liquid withdrawn from the bottom of this column is free from dissolved hydrogen fluoride. A portion thereof is passed through a gas-fired reboiler and returned to the bottom of the column at about 210° F., the liquid in the bottom having a temperature of about 185° F. The flow of fuel-gas to the reboiler is controlled by the pressure at the top of the column, being decreased if this pressure increases. The remainder of the liquid from the bottom of this column is passed to additional distillation and purification equipment, and a light alkylate fraction, having an end-point of about 353° F. and an octane number of about 89, is recovered as a product of the process. This light alkylate fraction is about 96.5% of the total alkylate.

From the top of the azeotrope tower vapors are cooled and condensed and passed to an accumulator-settler at a temperature of about 70° F. Liquid hydrofluoric acid settles out as a separate phase and is passed to the previously mentioned settling equipment; the liquid hydrocarbon phase is passed to the alkylation reactors. The top portion of this accumulator-settler is occupied by a gaseous mixture. This mixture is passed to the bottom of an absorption column comprising a vertical 4½ inch pipe 17 feet high. This absorber is packed with 12 feet of pipe rings made of Monel metal. A portion of liquid olefin-containing hydrocarbon feed is added to the top of this absorber at a temperature of about 85° F., a pressure of about 190 pounds gage, and a rate of about 1.5 barrels per hour. The liquid in the bottom of the column is maintained at about 120° F. The temperature at the top of the absorber is about 90° F. and the pressure about 160 pounds gage. A gas, substantially free from hydrogen fluoride, is removed from the top of the absorber at a rate of about 28 cubic feet per hour. Compositions of various streams are shown in the following table. The liquid from the absorber is passed to the alkylation reactors.

| | Gas to Absorber Gas Volume Per cent | Gas from Absorber Gas Volume Per cent | Liquid from Absorber Liquid Volume Per cent |
|---|---|---|---|
| Nitrogen and Hydrogen | 16.9 | 16.4 | |
| Methane | 30.9 | 26.2 | |
| Ethane | 3.7 | 0.6 | 1.4 |
| Propane | 16.5 | 10.6 | 13.5 |
| Butanes and Butenes | 32.0 | 46.2 | 77.6 |
| Pentanes and Heavier | | | 1 7.5 |
| Total Acid Free | 100.0 | 100.0 | 100.0 |
| Wt. per cent Hydrofluoric acid | 20.6 | 0.3 | |

1 Pentanes and heavier are principally reaction products of the acid and B-B hydrocarbon absorbent.

Over an extended period of time at least about 98% of the hydrogen fluoride in the gas mixture charged to the absorber is removed, and often the removal is better than 99 per cent.

Although, in this specific operation, the absorber was physically separate from the accumulator-settler, in many instances it is desirable, and preferred, to mount it upon the top of this accumulator-settler, with the absorption liquid flowing directly into the accumulator-settler. The equipment, and operation, for such a modification is quite simple, as will be readily appreciated.

We claim:

1. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing effluents of said alkylation zone to separating means and therein separating a liquid hydrocarbon phase from a liquid hydrofluoric acid phase, passing said hydrocarbon phase to a fractional distillation and removing therefrom as a low-boiling product a minor fraction comprising substantially all the hydrogen fluoride dissolved in said hydrocarbon phase and some of the low-boiling paraffins contained therein, removing also therefrom a high-boiling product comprising a major part of said hydrocarbon phase substantially free from hydrogen fluoride, cooling and condensing said minor fraction and passing same to an accumulator, passing resulting condensate from said accumulator into said alkylation zone, removing from said accumulator a gaseous fraction comprising undesired low-boiling hydrocarbons and hydrogen fluoride, passing said gaseous fraction to an absorber, passing to said absorber as an absorption liquid a liquid low-boiling olefin-containing hydrocarbon material and containing same therein with said gaseous fraction, discharging unabsorbed gases, and passing the resulting rich absorption liquid from said absorber to said alkylation zone.

2. The process of claim 1 in which said olefin-containing absorption liquid is a portion of an olefin-containing material charged to said alkylation zone.

3. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing an effluent of said alkylation zone to a separating means and therein separating a liquid hydrocarbon phase from a liquid hydrofluoric acid phase, passing said hydrocarbon phase to a fractional distillation and removing therefrom a low-boiling fraction comprising substantially all of the hydrogen fluoride dissolved in said hydrocarbon phase and some of the low-boiling paraffins contained therein, removing also therefrom a high-boiling fraction comprising a major part of said hydrocarbon phase substantially free from hydrogen fluoride, cooling and condensing said low-boiling fraction and passing same to said separating means, removing from said separating means a gaseous fraction comprising undesired low-boiling hydrocarbons and hydrogen fluoride, passing said gaseous fraction to an absorber, passing to said absorber as an absorption liquid a low-boiling olefin-containing hydrocarbon material and contacting same therein with said gaseous fraction, discharging unabsorbed gases, and passing a resulting rich absorption liquid containing hydrogen fluoride and alkyl fluoride from said absorber to said alkylation zone.

4. In a continuous process for the conversion of hydrocarbons in the presence of a hydrofluoric acid catalyst, the improvement which comprises passing a hydrocarbon charge and a hydrofluoric acid catalyst to a reaction zone, maintaining contents of said zone under reaction conditions, passing an effluent of said zone to a separating means and therein separating a hydrocarbon phase from a liquid hydrofluoric acid phase, passing said hydrocarbon phase to a distillation and removing therefrom a low-boiling fraction comprising hydrogen fluoride and low-boiling hydrocarbons and a high-boiling fraction comprising a major part of said hydrocarbon phase substantially free from hydrogen fluoride, cooling and condensing said low-boiling fraction and passing same to an accumulator, passing a resulting condensate from said accumulator to said reaction zone, removing from said accumulator a gaseous fraction comprising hydrogen fluoride and undesired low-boiling hydrocarbons, passing said gaseous fraction to an absorber, passing to said absorber as an absorption liquid a liquid low-boiling olefin-containing hydrocarbon material and contacting same therein with said gaseous fraction, discharging unabsorbed gases, and passing a resulting rich absorption liquid containing hydrogen fluoride and alkyl fluoride from said absorber to said separating means.

5. In a continuous process for the conversion of hydrocarbons in the presence of a hydrofluoric acid catalyst, the improvement which comprises passing a hydrocarbon charge and a hydrofluoric acid catalyst to a reaction zone, maintaining contents of said zone under reaction conditions, passing an effluent of said zone to a separating means and therein separating a hydrocarbon phase from a liquid hydrofluoric acid phase, passing said hydrocarbon phase to a distillation and removing therefrom a low-boiling fraction comprising hydrogen fluoride and low-boiling hydrocarbons and a high-boiling fraction comprising a major part of said hydrocarbon phase substantially free from hydrogen fluoride, cooling and condensing said low-boiling fraction and passing same to said separating means, removing from said separating means a gaseous fraction comprising hydrogen fluoride and undesired low-boiling hydrocarbons, passing said gaseous fraction to an absorber, passing to said absorber as an absorbent liquid a low-boiling olefin-containing hydrocarbon material and contacting same therein with said gaseous fraction, discharging unabsorbed gases, and passing a resulting rich absorbent liquid containing hydrogen fluoride and alkyl fluoride to said reaction zone.

6. In a process for the alkylation of isobutane with butylene in the presence of substantially anhydrous hydrogen fluoride comprising the steps of passing isobutane and butylene in a mol ratio of about 3:1 to about 10:1 of isobutane to butylene to a reaction zone, admixing hydrogen fluoride in a ratio of about 1:1 to about 10:1 of hydrocarbon to hydrogen fluoride in said reaction zone with said isobutane and said butylene, maintaining the resulting mixture under alkylation reaction conditions, passing an effluent containing hydrogen fluoride and isobutane and heavier hydrocarbons together with minor amounts of lower boiling material from said reaction zone to a separating means and therein separating a liquid hydrocarbon phase containing hydrogen fluoride dissolved therein from a liquid hydrogen fluoride phase, passing said hydrocarbon phase to a fractional distillation and removing therefrom as a low-boiling product a minor fraction comprising hydrogen fluoride which was dissolved in said hydrocarbon phase and substantially all of said lower-boiling material, removing also therefrom as a high-boiling product a major fraction comprising said isobutane and heavier hydrocarbons substantially free from hydrogen fluoride, cooling and condensing said minor fraction, separating resulting condensate from uncondensed vapor and introducing resulting condensate into said reaction zone, the improvement which comprises passing uncondensed vapor of said minor fraction to an absorber, maintaining the temperature between about 50 and about 150° F. in said absorber, passing to said absorber as an absorption liquid a liquid hydrocarbon material comprising at least one olefin hydrocarbon having not less than four and not more than six carbon atoms per molecule in an amount molecularly equivalent to the hydrogen fluoride content of uncondensed vapor of said minor fraction and contacting same therein with said uncondensed vapor of said minor fraction, discharging an unabsorbed substantially hydrogen fluoride-free vapor, passing resulting rich absorption liquid containing hydrogen fluoride and alkyl fluoride into said reaction zone.

7. In a process for the alkylation of isobutane with butylene in the presence of substantially anhydrous hydrogen fluoride comprising the steps of passing isobutane and butylene in the mol ratio of about 3:1 to about 10:1 of isobutane to butylene to a reaction zone, admixing hydrogen fluoride in a ratio of about 1:1 to about 10:1 of hydrocarbon to hydrogen fluoride in said reaction zone with said isobutane and said butylene, maintaining the resulting mixture under alkylation reaction conditions, passing an effluent containing hydrogen fluoride and isobutane and heavier hydrocarbons together with minor amounts of lower boiling material from said reaction zone to a separating means and therein separating a liquid hydrocarbon phase containing hydrogen fluoride dissolved therein from a liquid hydrogen fluoride phase, passing said hydrocarbon phase to a fractional distillation and removing therefrom as a low-boiling product a fraction comprising hydrogen fluoride which was dissolved in said hydrocarbon phase and substantially all of said lower-boiling material, removing also therefrom as a high-boiling product a fraction comprising said isobutane and heavier hydrocarbons substantially free from hydrogen fluoride, cooling and condensing said low-boiling fraction and passing same into said separating means, the improvement which comprises passing uncondensed vapor of said low-boiling fraction from said settling means to an absorber, maintaining a temperature between about 50 and about 150° F. in said absorber, passing to said absorber as an absorption liquid a liquid hydrocarbon material comprising at least one olefin hydrocarbon having not less than four and not more than six carbon atoms per molecule in the amount at least molecularly equivalent to the hydrogen fluoride content of uncondensed vapor of said low-boiling fraction and contacting same therein with said uncondensed vapor, discharging an unabsorbed substantially hydrogen fluoride-free vapor, and passing the resulting rich absorption liquid containing hydrogen fluoride and alkyl fluoride into said reaction zone.

8. In a process for the conversion of hydrocarbons in the presence of a hydrofluoric acid catalyst, the improvement which comprises converting hydrocarbons in the presence of a hydrofluoric acid catalyst in a reaction zone, passing an effluent from said reaction zone to a separating means, separating a hydrocarbon phase from a liquid hydrofluoric acid phase in said separating means, passing said hydrocarbon phase to a distillation, removing a low-boiling fraction comprising hydrogen fluoride and low-boiling hydrocarbons and a high-boiling fraction comprising the remainder of said hydrocarbon phase substantially free from hydrogen fluoride from said distillation, cooling and condensing said low-boiling fraction and passing same to an accumulator, passing resulting condensate to said reaction zone, removing from said accumulator a gaseous fraction comprising low-boiling hydrocarbons and hydrogen fluoride, passing said gaseous fraction to an absorber, contacting said gaseous fraction in an absorber with an absorption liquid comprising an olefin-containing hydrocarbon material, discharging unabsorbed gases, and passing a resulting rich absorption liquid from said absorber to said separating means.

9. In a process for the conversion of hydrocarbons in the presence of a hydrofluoric acid catalyst, the improvement which comprises converting hydrocarbons in the presence of a hydrofluoric acid catalyst in a reaction zone, passing an effluent from said reaction zone to a separating means, separating a hydrocarbon phase from a liquid hydrofluoric acid phase in said separating means, passing said hydrocarbon phase to a distillation, removing a low-boiling fraction comprising hydrogen fluoride and low-boiling hydrocarbons and a high-boiling fraction comprising the remainder of said hydrocarbon phase substantially free from hydrogen fluoride from said distillation, cooling and condensing said low-boiling fraction and passing same to an accumulator, passing resulting condensate to said reaction zone, removing from said accumulator a gaseous fraction comprising low-boiling hydrocarbons and hydrogen fluoride, passing said gaseous fraction to an absorber, contacting said gaseous fraction in said absorber with an absorption liquid comprising an olefin-containing hydrocarbon material, discharging unabsorbed gases, and passing resulting rich absorption liquid to said reaction zone.

10. In a continuous process for the alkylation of a low-boiling isoparaffin by reaction with a low-boiling olefin in the presence of hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing an effluent of said alkylation zone to a separating means and therein separating a liquid hydrocarbon phase from a liquid hydrofluoric acid phase, passing said hydrocarbon phase to a fractional distillation and removing therefrom a low-boiling fraction comprising substantially all of the hydrogen fluoride dissolved in said hydrocarbon phase and some of the low-boiling paraffins contained therein, removing also therefrom a high-boiling fraction comprising a major part of said hydrocarbon phase substantially free from hydrogen fluoride, cooling and condensing said low-boiling fraction and passing same to said separating means, removing from said separating means a gaseous fraction comprising undesired low-boiling hydrocarbons and hydrogen fluoride, passing said gaseous fraction to an absorber, passing to said absorber as an absorption liquid an olefin-containing hydrocarbon material comprising at least one olefin hydrocarbon having not less than four and not more than six carbon atoms per molecule and contacting same therein with said gaseous fraction, discharging unabsorbed gases, and passing resulting rich absorption liquid containing hydrogen fluoride and alkyl fluoride from said absorber to said separating means.

ANCEL B. LEONARD.
GEORGE R. HETTICK.

REFERENCES CITED

The following references are of record in the file of this patent:

UNITED STATES PATENTS

| Number | Name | Date |
|---|---|---|
| 2,307,799 | Linn | Jan. 12, 1943 |
| 2,347,317 | Gibson | Apr. 25, 1944 |
| 2,342,677 | Linn | Feb. 29, 1944 |
| 2,317,901 | Frey | Apr. 27, 1943 |
| 2,322,800 | Frey | June 29, 1943 |
| 2,371,341 | Matuszak | Mar. 13, 1945 |
| 2,372,338 | Penisten | Mar. 27, 1945 |

FOREIGN PATENTS

| Number | Country | Date |
|---|---|---|
| 117,359 | Australia | Aug. 5, 1943 |

---

Certificate of Correction

Patent No. 2,425,745.  August 19, 1947.

ANCEL B. LEONARD ET AL.

It is hereby certified that error appears in the printed specification of the above numbered patent requiring correction as follows: Column 7, line 74, claim 1, for "containing" second occurrence, read *contacting*; and that the said Letters Patent should be read with this correction therein that the same may conform to the record of the case in the Patent Office.

Signed and sealed this 4th day of November, A. D. 1947.

[SEAL]

THOMAS F. MURPHY,
*Assistant Commissioner of Patents.* the remainder of said hydrocarbon phase substantially free from hydrogen fluoride from said distillation, cooling and condensing said low-boiling fraction and passing same to an accumulator, passing resulting condensate to said reaction zone, removing from said accumulator a gaseous fraction comprising low-boiling hydrocarbons and hydrogen fluoride, passing said gaseous fraction to an absorber, contacting said gaseous fraction in said absorber with an absorption liquid comprising an olefin-containing hydrocarbon material, discharging unabsorbed gases, and passing resulting rich absorption liquid to said reaction zone.

10. In a continuous process for the alkylation of a low-boiling isoparaffin by reaction with a low-boiling olefin in the presence of hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing an effluent of said alkylation zone to a separating means and therein separating a liquid hydrocarbon phase from a liquid hydrofluoric acid phase, passing said hydrocarbon phase to a fractional distillation and removing therefrom a low-boiling fraction comprising substantially all of the hydrogen fluoride dissolved in said hydrocarbon phase and some of the low-boiling paraffins contained therein, removing also therefrom a high-boiling fraction comprising a major part of said hydrocarbon phase substantially free from hydrogen fluoride, cooling and condensing said low-boiling fraction and passing same to said separating means, removing from said separating means a gaseous fraction comprising undesired low-boiling hydrocarbons and hydrogen fluoride, passing said gaseous fraction to an absorber, passing to said absorber as an absorption liquid an olefin-containing hydrocarbon material comprising at least one olefin hydrocarbon having not less than four and not more than six carbon atoms per molecule and contacting same therein with said gaseous fraction, discharging unabsorbed gases, and passing resulting rich absorption liquid containing hydrogen fluoride and alkyl fluoride from said absorber to said separating means.

ANCEL B. LEONARD.
GEORGE R. HETTICK.

REFERENCES CITED

The following references are of record in the file of this patent:

UNITED STATES PATENTS

| Number | Name | Date |
|---|---|---|
| 2,307,799 | Linn | Jan. 12, 1943 |
| 2,347,317 | Gibson | Apr. 25, 1944 |
| 2,342,677 | Linn | Feb. 29, 1944 |
| 2,317,901 | Frey | Apr. 27, 1943 |
| 2,322,800 | Frey | June 29, 1943 |
| 2,371,341 | Matuszak | Mar. 13, 1945 |
| 2,372,338 | Penisten | Mar. 27, 1945 |

FOREIGN PATENTS

| Number | Country | Date |
|---|---|---|
| 117,359 | Australia | Aug. 5, 1943 |

---

Certificate of Correction

Patent No. 2,425,745.  August 19, 1947.

ANCEL B. LEONARD ET AL.

It is hereby certified that error appears in the printed specification of the above numbered patent requiring correction as follows: Column 7, line 74, claim 1, for "containing" second occurrence, read *contacting*; and that the said Letters Patent should be read with this correction therein that the same may conform to the record of the case in the Patent Office.

Signed and sealed this 4th day of November, A. D. 1947.

[SEAL]

THOMAS F. MURPHY,
*Assistant Commissioner of Patents.*